US011984756B2

(12) United States Patent
Ding et al.

(10) Patent No.: US 11,984,756 B2
(45) Date of Patent: May 14, 2024

(54) DYNAMIC ADJUSTMENT OF CHARGING VOLTAGE SUPPLIED FROM A FIRST DEVICE TO A SECOND DEVICE

(71) Applicant: Google LLC, Mountain View, CA (US)

(72) Inventors: Yao Ding, San Jose, CA (US); Trevor Hermosillo, Santa Clara, CA (US); Maksim Shmukler, San Jose, CA (US); Chi Kin Benjamin Leung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 220 days.

(21) Appl. No.: 17/245,462

(22) Filed: Apr. 30, 2021

(65) Prior Publication Data

US 2021/0249892 A1    Aug. 12, 2021

Related U.S. Application Data

(63) Continuation of application No. 16/168,050, filed on Oct. 23, 2018, now Pat. No. 11,025,084.

(51) Int. Cl.
*H02J 7/34* (2006.01)
*H02J 7/00* (2006.01)
*H04R 1/10* (2006.01)

(52) U.S. Cl.
CPC ............ *H02J 7/342* (2020.01); *H04R 1/1016* (2013.01); *H04R 1/1025* (2013.01); *H04R 1/1041* (2013.01); *H02J 7/00034* (2020.01); *H02J 7/00302* (2020.01); *H02J 7/00309* (2020.01); *H02J 7/0044* (2013.01);
(Continued)

(58) Field of Classification Search
CPC .... H02J 7/342; H02J 7/00034; H02J 7/00302; H02J 7/00309; H02J 7/0044; H02J 7/007182; H02J 7/007192; H02J 2207/20; H02J 7/007194; H04R 1/1016; H04R 1/1025; H04R 1/1041; H04R 2420/07
See application file for complete search history.

(56) References Cited

U.S. PATENT DOCUMENTS 6,476,585 B1    11/2002   Simmonds
8,441,235 B2     5/2013   Shi et al.
(Continued)

OTHER PUBLICATIONS

Can You Hear Me Now? Extend the Life of Your Hearable Device, Retrieved from the internet: https://www.maximintegrated.com/content/dam/files/design/technical-documents/design-solutions/DS57-Can-You-Hear-Me-Now-Extend-the-Life-of-Your-Hearable-Device.pdf., Nov. 2017, 3 pages.
(Continued)

*Primary Examiner* — Stacy Whitmore
(74) *Attorney, Agent, or Firm* — Colby Nipper PLLC

(57) ABSTRACT

A first electronic device, electronically coupled to a second device for supplying a charge to the second electronic device, tracks the voltage requirements of the second device and dynamically adjusts its output voltage upwards or downwards to match such requirements. The second electronic device may provide feedback to the first electronic device through a feedback loop. The feedback may include an indication of the voltage requirements and/or instructions for adjusting the voltage output of the first electronic device. The second device may be, for example, a wearable audio device, while the first device is a case for the wearable audio device.

20 Claims, 9 Drawing Sheets

(52) U.S. Cl.
CPC ... *H02J 7/007182* (2020.01); *H02J 7/007192* (2020.01); *H02J 2207/20* (2020.01); *H04R 2420/07* (2013.01)

(56) References Cited

U.S. PATENT DOCUMENTS

| | | | |
|---|---|---|---|
| 8,638,011 B2* | 1/2014 | Robinson | H02M 5/04 |
| | | | 307/115 |
| 9,219,369 B2 | 12/2015 | Mehta et al. | |
| 9,769,558 B2 | 9/2017 | Chandramohan et al. | |
| 9,924,010 B2 | 3/2018 | Watson et al. | |
| 11,025,084 B2* | 6/2021 | Ding | H02J 7/342 |
| 2006/0022640 A1 | 2/2006 | Frith et al. | |
| 2012/0025752 A1 | 2/2012 | Teggatz et al. | |
| 2012/0146576 A1 | 6/2012 | Partovi | |
| 2012/0194141 A1 | 8/2012 | Shi et al. | |
| 2013/0082662 A1 | 4/2013 | Carre et al. | |
| 2013/0141035 A1 | 6/2013 | Tam | |
| 2014/0327410 A1 | 11/2014 | Patel et al. | |
| 2016/0087474 A1 | 3/2016 | Tallada et al. | |
| 2016/0141910 A1 | 5/2016 | Klawon et al. | |
| 2016/0336767 A1 | 11/2016 | Zane et al. | |
| 2017/0094389 A1 | 3/2017 | Saulsbury et al. | |
| 2017/0222453 A1 | 8/2017 | Wang et al. | |
| 2017/0288421 A1 | 10/2017 | Greening | |
| 2017/0294793 A1 | 10/2017 | Yoon et al. | |
| 2017/0311105 A1 | 10/2017 | Hariharan et al. | |
| 2018/0175651 A1 | 6/2018 | Chen et al. | |
| 2019/0123649 A1 | 4/2019 | Dalena | |
| 2019/0222031 A1 | 7/2019 | Carpenter, Jr. et al. | |
| 2020/0127482 A1 | 4/2020 | Ding et al. | |

OTHER PUBLICATIONS

"Final Office Action", U.S. Appl. No. 16/168,050, filed Jan. 12, 2021, 16 pages.

"Non-Final Office Action", U.S. Appl. No. 16/168,050, filed Jan. 7, 2020, 11 pages.

"Notice of Allowance", U.S. Appl. No. 16/168,050, filed Feb. 1, 2021, 5 pages.

* cited by examiner

DYNAMIC ADJUSTMENT OF CHARGING VOLTAGE SUPPLIED FROM A FIRST DEVICE TO A SECOND DEVICE

CROSS-REFERENCE TO RELATED APPLICATIONS

The present application is a continuation of U.S. patent application Ser. No. 16/168,050, filed on Oct. 23, 2018, the disclosure of which is hereby incorporated herein by reference.

BACKGROUND

A typical hearable device is designed with a case and two earbuds. The case provides protection when the earbuds are not in use. The case may also charge the earbuds by transferring power from its internal battery to a battery of the earbuds.

Smaller earbud designs typically include a battery under 50 mAh. Linear charging is often used to transfer power from the case to such smaller earbuds, but linear charging is very lossy. A linear charger requires a voltage higher than the battery to be charged, and regulates a voltage drop between a source and a load by inserting a resistive device to keep load voltage stable. The amount of loss is equal to the voltage drop multiplied by the current. The system power delivery efficiency is typically under 80%.

If the charging efficiency is low, a bigger battery is needed in the case. The extra heat generation can also shorten the life of the batteries in both the case and the earbuds, and cause discomfort to users. Accordingly, it is important for the power delivery to be efficient in order to maximize life and usage of the earbuds, while keeping a size of the batteries as small as possible.

BRIEF SUMMARY

A new system and method for delivering power from a case to earbuds or other wearable audio devices is described herein. The wearable audio devices can have a small linear charger, with low input dropout voltage. The case has two channel-adjustable output voltages. A communication line between the wearable audio device and the case allows the wearable device to report charging status. By way of example only, the wearable audio device may report to the case that an input to its charger is too low, and needs to increase by 10 mV. The case will dynamically adjust the output voltage, to just meet the minimum voltage requirement at buds. Such a design provides a significant improvement in power delivery efficiency.

One aspect of the disclosure provides a system for charging a second device by a first device. The system includes a power source device, including a voltage source, a buck-boost regulator adapted to receive input from the voltage source and provide a variable voltage output, and a controller in communication with the buck-boost regulator. The system further includes a power receiver device adapted to electronically couple with the power source device through a power line and a communication line. The power receiver device includes a linear charger adapted to receive a voltage from the power source device through the power line, a battery adapted to receive output from the linear charger, and a control unit adapted to provide feedback to the power source device over the communication line. The controller of the power source device causes the buck-boost regulator to adjust its voltage output based on the feedback from the power receiver device. In some examples, the communication line and the power line may be integrated.

The power source device may be, for example, a case for an electronic accessory and the power receiver device may be the electronic accessory, such as a pair of earbuds. The power source device may include two buck-boost regulators, the first buck-boost regulator providing a first voltage output to a first earbud and the second buck-boost regulator providing a second voltage output to the second earbud. The first voltage output and the second voltage output may be different or the same.

The control unit of the power receiver device may be configured to determine a difference between a first received voltage and voltage requirements of the power receiver device. The feedback may include instructions for adjusting the first received voltage. The instructions may include a direction and a size for the adjustment. In other examples, the feedback includes an indication of voltage requirements of the power receiver device. The control unit of the power receiver device may be configured to detect when the voltage received from the power source device is different from voltage requirements of the power receiver device, and provide the feedback in response to determining that the received voltage is different from the voltage requirements.

Another aspect of the disclosure provides a power source device, including a voltage source, a buck-boost regulator adapted to receive input from the voltage source and provide a variable voltage output to a second device, and a controller in communication with the buck-boost regulator, the controller adapted to receive feedback from the second device and to cause the buck-boost regulator to adjust its voltage output based on the feedback from the second device. The controller may be adapted to determine, based on the received feedback, voltage requirements of the second device. For example, the controller may be configured to compute an adjustment of the voltage output based on the voltage output and the determined voltage requirements. The controller may include an error amplifier receiving input from a reference voltage and a digital to analog converter.

Yet another aspect of the disclosure provides a power receiver device, including a linear charger adapted to receive a voltage from a power source device through a power line connection, a battery adapted to receive output from the linear charger, a control unit adapted to determine voltage requirements of the power receiver device and to provide feedback regarding the voltage requirements to the power source device over the communication line. The control unit may be configured to determine a difference between the received voltage and the voltage requirements of the power receiver device. The feedback may include instructions for adjusting the first received voltage. The instructions may include a direction and a size for the adjustment. The control unit may be further configured to detect when the voltage received from the power source device is different from voltage requirements of the power receiver device, and provide the feedback in response to determining that the received voltage is different from the voltage requirements.

DETAILED DESCRIPTION

The present disclosure provides for a power source device adapted to supply an adjustable voltage to a power receiver device to charge a battery of the power receiver device. The amount of voltage supplied may be adjusted based on requirements of the power receiver device. For example, the adjustment may be based on feedback from the power receiver device. In one example, the power receiver device may specify an amount of increase or decrease in voltage required. In another example, the power receiver device may communicate its voltage requirements, and allow the power source device to determine how the supplied voltage should be adjusted. Voltage requirements of the power receiver device may change, for example, based on temperature, battery voltage, or other conditions. For example, the power receiver device takes the input voltage, and charges its internal battery. The battery may have one or more different charging algorithms, such as at temperatures between 0-15 C, only charge at 0.5 C rating, or when the battery voltage is under 3V, charge at 0.1 C, etc. The charger may also have different characteristics. For example, when temperature is higher, the voltage drop across the charger may also be higher to accommodate the extra loss in the charger, etc.

In some examples herein, the power source device is described as a case for an electronic accessory, while the power receiver device is described as the electronic accessory, such as a pair of earbuds. It should be understood, however, that the power source device and power receiver device may include any number and combinations of other devices, such as mobile phones, wireless chargers, smartwatches, headsets, etc. In some examples, the power source device may be used to transmit power to a plurality of different power receiver devices, each having their own voltage requirements.

Figure 1:
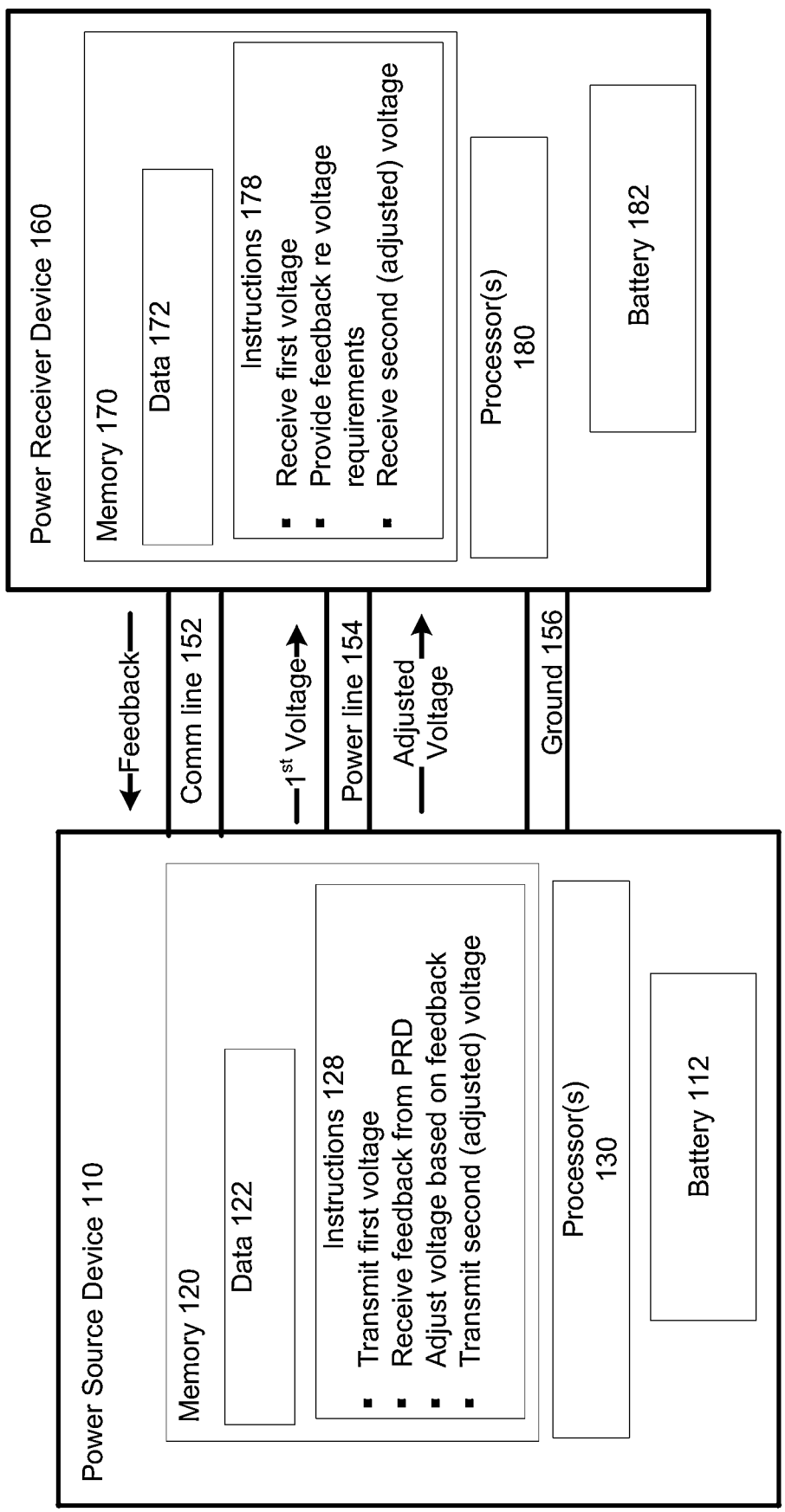
FIG. 1 is a functional block diagram illustrating an example system according to aspects of the disclosure.

FIG. 1 illustrates an example of a power source device (PSD) 110 which supplies power to a power receiver device (PRD) 160. For example, the PSD 110 includes a power source, such as a battery 112, which can supply a charge to battery 182 of the PRD 160. The PSD and PRD 110, 160 may be electronically coupled, for example, via one or more contacts on each device, in addition to the ground connection 156. For example, when the contacts meet, one or more lines may be established between the PSD 110 and PRD 160, such as a communication line 152, a power line 154, and a ground line 156. While three lines are shown in this example, it should be understood that in other examples more or fewer lines may be established. For example, the communication line may be integrated with the power line. As another example, multiple communication lines, power lines, or other types of lines may be established between the PRD and the PSD.

The charge from the PSD 110 to the PRD 160 may be supplied through the power line 154. As shown in FIG. 1, the PSD 110 supplies a first voltage to the PRD 160 over the power line 154, and receives feedback from the PRD 160 over the communication line 152. The PSD 110 also supplies a second updated voltage to the PRD 160 over the power line, for example, based on the feedback.

The PSD 110 may be any of a variety of types of devices. For example, the PSD 110 may be a mobile phone, laptop, wireless charging station, a case for an electronic accessory, etc. The PRD 160 may also be any of a variety of types of devices, such as a smartwatch, earbuds, headsets, head-mounted display, fitness tracker, etc. While only one PRD 160 is shown, the PSD 110 may be coupled to multiple PRDs simultaneously. For example, the PSD 110 may be simultaneously coupled to two earbuds, and may adjust the voltage supplied to both earbuds with same or different levels.

The PSD 110 may include one or more processors 130, one or more memories 120, as well as other components, such as a battery 112. The memory 120 may store information accessible by the one or more processors 130, including data 122 and instructions 128 that may be executed or otherwise used by the one or more processors 130. For example, memory 120 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 120 may be a static random-access memory (SRAM) configured to provide fast lookups. Systems and methods may include different combinations of the foregoing, whereby different portions of the instructions and data are stored on different types of media.

The data 122 may be retrieved, stored, or modified by the one or more processors 130 in accordance with the instructions 128. For instance, data 122 may include information regarding various possible voltage requirements of the PRD 160, default settings, etc. Although the claimed subject matter is not limited by any particular data structure, the data may be stored in computing device registers, in a relational database as a table having a plurality of different fields and records, XML documents or flat files. The data may also be formatted in any computing device-readable format.

The instructions 128 may be any set of instructions to be executed directly (such as machine code) or indirectly (such as scripts) by the one or more processors 130. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 130 may be microprocessors, logic circuitry (e.g., logic gates, flip-flops, etc.) hard-wired into the device 110 itself, or may be a dedicated application specific integrated circuit (ASIC). It should be understood that the one or more processors 130 are not limited to hard-wired logic circuitry, but may also include any commercially available processing unit, or any hardware-based processors, such as a field programmable gate array (FPGA). In some examples, the one or more processors 130 may include a state machine.

The PRD 160 may include components similar to those of the PSD 110. For example, the PRD 160 may include memory 170 including data 172 and instructions 178, one or more processors 180, a battery 182, and other components typically found in electronic accessories. The instructions 178 may be executed by the one or more processors 180 to complete the firmware reset upon receipt of the reset command from the first electronic device 110.

Figure 2:
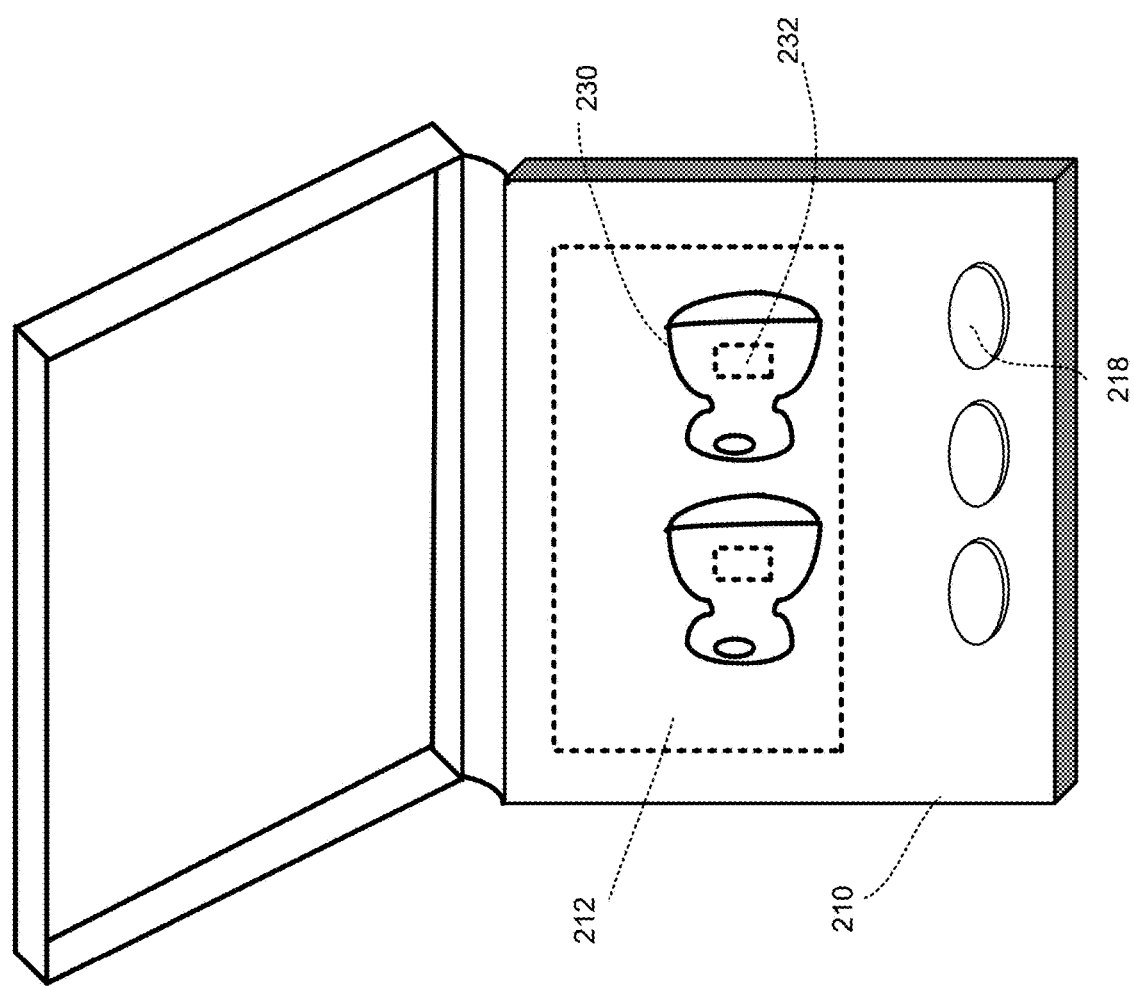
FIG. 2 is an example pictorial diagram of the system of FIG. 1.

FIG. 2 provides a pictorial diagram illustrating an example of the devices of FIG. 1. As shown in this example, the PSD is a case 210 and the PRD is a pair of earbuds 230. The earbuds 230 may be wireless in that they do not require a wired connection to a music player, phone, or other device to be powered. In some examples, each earbud may further be wireless from one another. The earbuds 230 include one or more batteries 232 which provide power to the earbuds 230 and other components therein, such as transmitters, receivers, amplifiers, sensors, etc. The batteries 232 of the earbuds 230 may be relatively small, in view of the small size of the earbuds 230. The case 210 in which the earbuds 230 are shipped and stored may have a larger battery 212. This larger battery 212 of the case 210 may deliver a charge to the smaller batteries 232 of the earbuds 230.

When the earbuds 230 are placed inside the case 210 in a given orientation, contacts (not shown) on the earbuds 230 may come into contact with contacts on the case 210 to establish an electrical connection, such as a power line, ground line connections and a communication line connection. In some examples, each earbud may operate independently, and thus a power line connection is established with a first earbud, while separate power line connection is established with a second earbud.

The case 210 delivers voltage to the earbuds 230 to charge the batteries 232 of the earbuds 230. For example, the voltage may be supplied automatically upon detection of the earbuds 230 by the case 210. In other examples, transmission of the voltage from the case 210 to the earbuds 230 may be triggered manually, such as by activation of one or more controls. The controls 218 may be, for examples, buttons, switches, toggles, or any other type of control. The controls 218 may be used to start or stop a flow of voltage, or to perform any of a variety of other functions.

The case 210 may automatically adjust a level of the voltage supplied to the earbuds 230 based on requirements of the earbuds 230. For example, the case 210 may supply an initial voltage level to charge the batteries 232. The earbuds 230 may provide feedback, such as through the communication line or through another electrical connection, regarding the voltage. For example, the earbuds 230 may determine a voltage level required to charge the earbuds 230. The Lithium Ion battery charging curve has a precharge at low constant current, followed by constant current (CC), then a constant voltage (CV). The linear charger in the earbud 230 takes an input voltage, which is slightly higher than the battery 232 and regulates the voltage and current when charging the battery 232. At different charging current, the linear charger voltage drop is different. Accordingly, to determine the required voltage level, a circuit in the earbud 230 may sense the current need and voltage available. If the available voltage is too low, the circuit sends voltage-up commands to circuitry in the case 210, and vice versa.

In some examples, the required voltage level may be determined based on device specifications, operating conditions, temperature, remaining battery life, or other information. The earbuds 230 may communicate the required voltage level to the case 210. In some examples, the earbuds 230 may determine a difference between the required voltage level and the received voltage level, and communicate to the case how the voltage level should specifically be adjusted. For example, the earbuds may specify to the case to increase or decrease the voltage levels by a particular percentage, a particular number of some predetermined units, etc. In other examples, where the earbuds 230 do not specify how to adjust the voltage level, the case 210 may determine how to adjust the voltage level. For example, the case may compare the feedback received to the voltage being transmitted, and adjust the transmitted voltage incrementally or all at once.

While the example of FIG. 2 illustrates the first electronic device as a case and the second electronic device as an earbud, it should be understood that delivery of a charge from one device to another, wherein the first device tracks the voltage requirements of the second device and dynamically updates the supplied voltage, may be implemented in any of a variety of devices. By way of example only, the electronic devices may include any of a smartwatch, fitness tracker, head-mounted display, phone, phone accessories, toys, gaming systems, tablets, etc.

Figure 3:
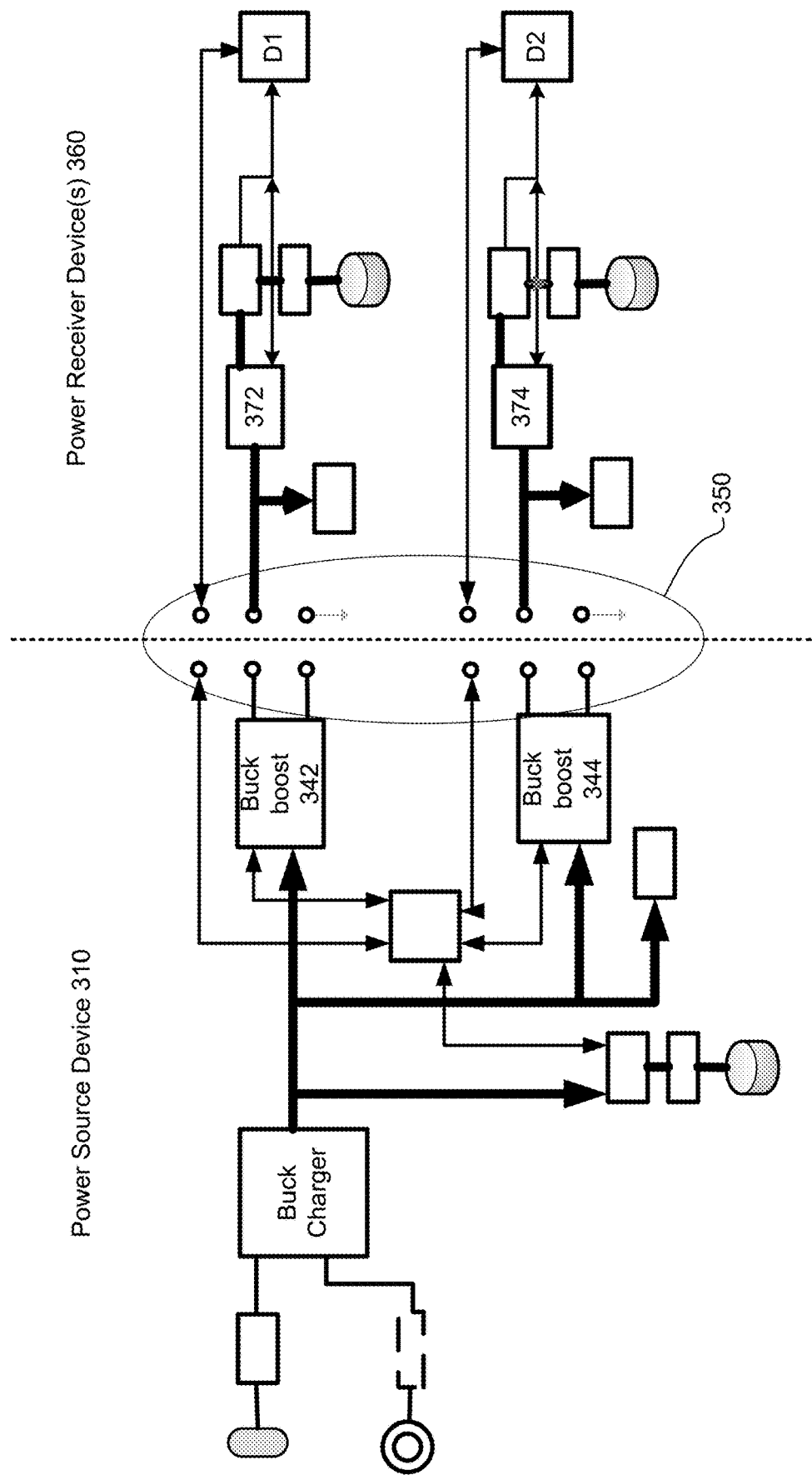
FIG. 3 is an example circuit diagram of the system of FIG. 1.
Figure 3A:
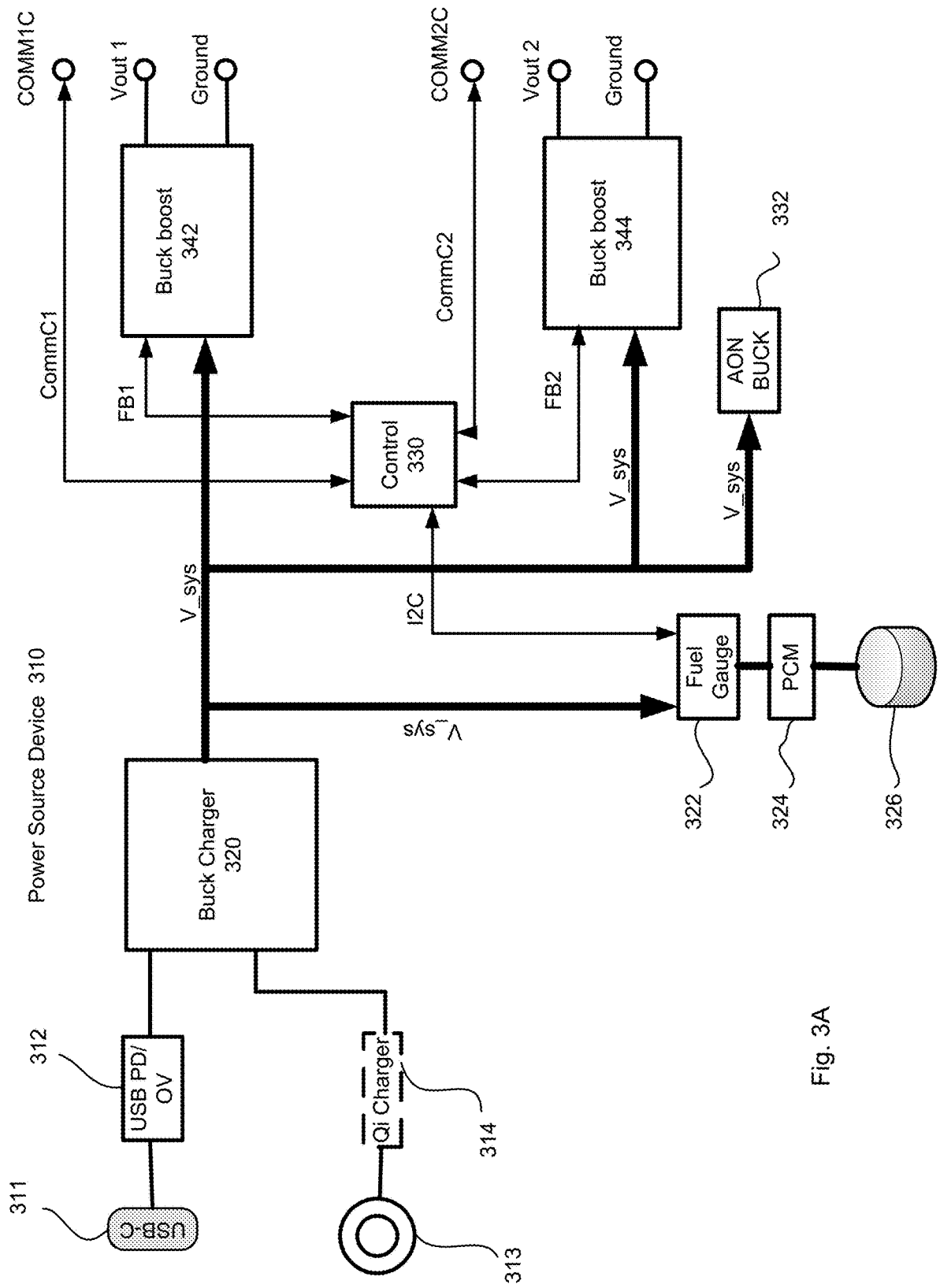
FIG. 3A is a detailed view of a portion of the circuit diagram of FIG. 3 corresponding to a power source device.
Figure 3B:
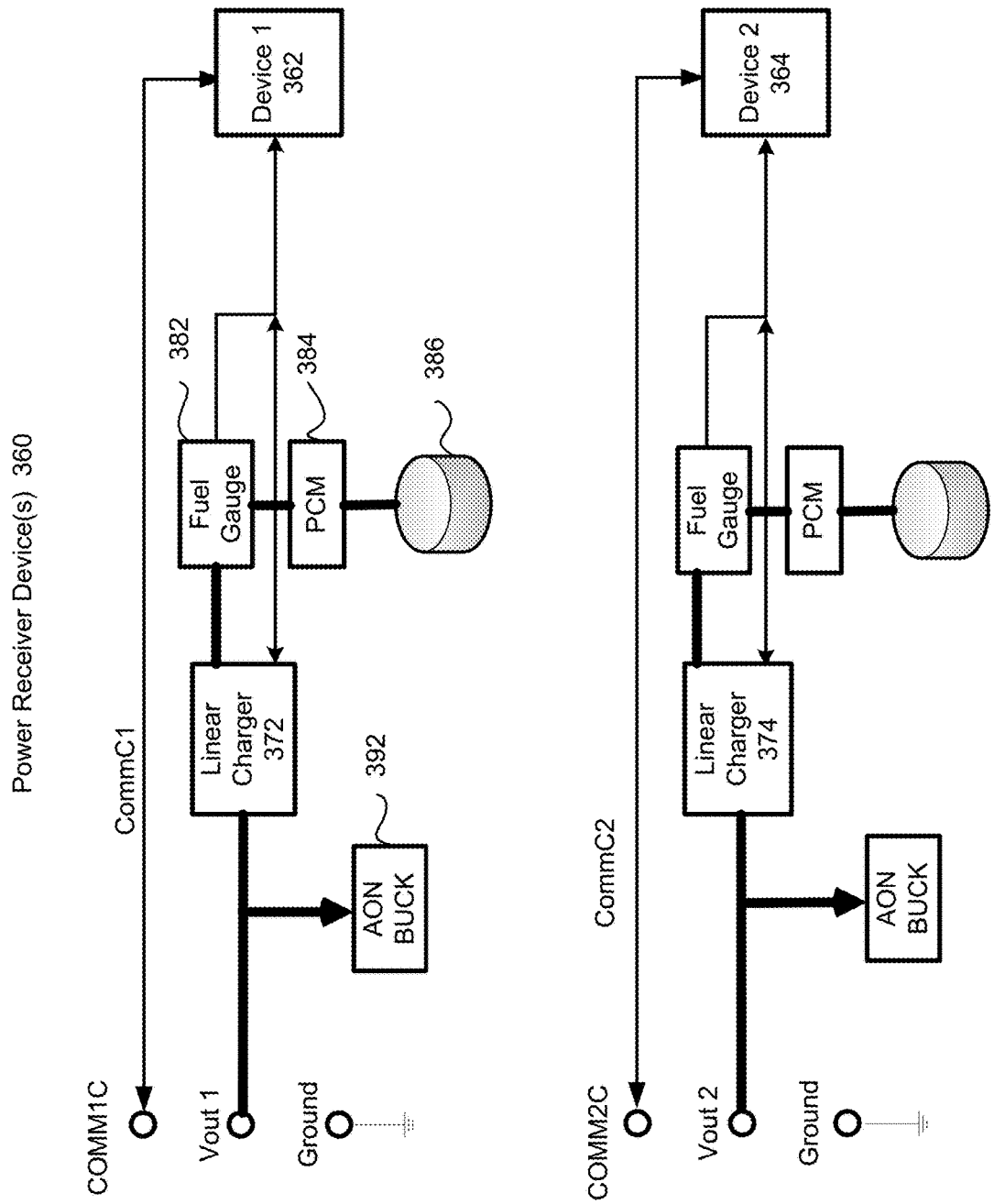
FIG. 3B is a detailed view of a portion of the circuit diagram of FIG. 3 corresponding to a power receiver device.

FIG. 3 provides an example circuit diagram of the system of FIG. 1. The power source device (PSD 310) on the left supplies power to the power receiver device (PRD 360) on the right through one of the electrical connections 350. The power source device and power receiver device may also exchange data over one or more of the electrical connections 350. For example, the power receiver device can supply voltage requirement information to the power source device, and the power source device can use such information to adjust the transmitted voltage levels. When recharging the PRD 360 without external power sources attached to the PSD 310, Buck-boost regulators 342, 344 turn on, creating a voltage just sufficient to allow each charger 372, 374 in the PRD 360 to operate. The Buck-boost regulators 342, 344 help maintain greater outputs from the PSD 310 than inputs to the PRD 360, despite that battery voltages in the PSD 310 and PRD 360 may be different. Efficiency for the PSD 310 in this example may be approximately 92% or better, and efficiency for the PRD 360 may be approximately 95%. Accordingly, an overall system efficiency calculated as (PSD efficiency*PRD efficiency) may be approximately 87% or higher. FIGS. 3A and 3B illustrate the power source device circuitry and power receiver device circuitry in more detail.

As shown in FIG. 3A, the PSD 310 includes a buck charger 320. The buck charger 320 takes a voltage higher than the battery to be charged, switching the battery path on and off, using inductance to filter the fluctuation, to create a stable average charging voltage/current. The control is at higher efficiency.

The buck charger 320 provides voltage to PSD battery 326, for example, when the PSD 310 is coupled to an external charging device. For example, the PSD 310 may receive an external charge through a port, such as USB-C port 311 or any other type of port. The USB-C port 311, as shown, is coupled to a USB power delivery unit 312. The PSD 310 may alternatively or additionally receive a charge through charging coil 313, coupled to inductive charger 314. Regardless of how the PSD 310 receives a charge from an external source, it may supply that charge to the battery 326.

In this example, a fuel gauge 322 and battery protection circuit module (PCM) 324 are coupled between the buck charger 320 and the PSD battery 326. The fuel gauge 322 may be a battery state of a charge tracking device, which can report battery voltage, current, state of charge, etc. The PCM 324 may provide a safeguard to prevent the battery 326 from overheating, overcharging, or the like.

The fuel gauge 322 further communicates with controller 330 through communication line I2C. For example, the fuel gauge 322 may provide information to the controller 330 regarding a charge state of the battery 326, or may receive information from the controller 330 such as feedback information from the buck boost regulators 342, 344, information communicated by the PRD 360 over communication lines CommC1 and CommC2, etc.

The buck charger 320 also provides voltage to buck boost regulators 342, 344, for example, when the PSD 310 supplies a charge to the PRD 360. Always On (AON) regulator 332 may be a power supply circuit that is running non-stop to support circuits that need to run continuously. The buck boost regulators 342, 344 can output either higher or lower voltage than the input. The regulation is done with near lossless switching topology. The buck boost regulators 342, 344 may thus provide a variable output voltage to the PRD 360 through contacts Vout1 and Vout2. The voltage levels may vary based on feedback received from the control 330. For example, the control 330 may determine, based on communications received from the PRD 360, that a higher voltage level is required by the PRD 360. Accordingly, the control 330 may cause the buck boost regulators 342, 344 to increase the supplied voltage levels. For example, the control 330 receives one or more commands on communication lines CommC1 and CommC2, and adjusts feedback based on individual channel requirements. The control 330 sends the feedback to the buck boost regulators 342, 344 over feedback lines FB1 and FB2, and in turn the buck boost regulators 342, 344 take the feedback and perform the output change.

FIG. 3A provides a circuit with analog control, where the feedback FB1 and FB2 pins are analog output from control 330 in a digital to analog converter (DAC), and connect to analog control input of buck boost regulators 342 and 344. In another example control topology, the circuitry may similarly include a buck boost regulator with analog feedback for output regulation, but where control is done with a digital potentiometer. For example, control 330 can drive a separate digital potentiometer, which can create a control voltage similar to the DAC output from control 330 in FIG. 3A. The separate digital potentiometer may provide for lower power consumption and/or higher precision.

As shown in the example of FIG. 3B, the PRD 360 includes two devices 362, 364, such as two earbuds. For simplicity, the architecture of one device is described in detail, though it should be understood that the other device may be similar or identical.

The PRD 360 includes a linear charger 372 that receives voltage from the PSD over the power line for charging a battery 386 of the device. The linear charger 372 takes a voltage higher than the battery 386 to be charged, and regulates the voltage drop between the incoming voltage and the battery 386 by inserting a resistive device, keeping load voltage/current stable. AON regulator 392 regulates the input voltage at pins Vout1 and Vout2, creates a power voltage for the individual channel 1 and channel 2 to operate. Similar to the PSD 310, a fuel gauge 382 and PCM 384 may be coupled between the charger 372 and the battery 386. The device 362 may communicate with the linear charger 372, fuel gauge 382, and PSD 310. For example, the device 362 may determine voltage requirements based on information from the fuel gauge 382, and communication such information over the communication line CommC1 to the PSD.

The output voltage from the PSD 310 can track voltage demands of the PRD 360 in a number of different ways. According to one method, the device 362 can send a voltage direction adjustment and step size to the control 330 of the PSD 310. As some examples of the direction and step size, the device 362 can request the voltage to be increased by one step, decreased by 11 steps, etc. As another example of direction and step size, the device 362 can request that the voltage be increased by 10 mV, decreased by 5 mV, etc. According to another method, the device 362 can send its voltage and current to the PSD 310, and let the PSD 310 figure out the voltage change. For example, the control 330 may receive the information from the PRD 360 regarding its voltage and current, compare those values to the voltage and current being output by the PSD 310, and adjust the voltage and current being output by the PSD 310 to match the values received from the PRD 360. Further details of a feedback loop between the PRD 360 and the PSD 310 are discussed below in connection with FIG. 4.

While the example of FIGS. 3, 3A and 3B include two power receiver devices, and therefore two buck boost regulators 342, 344, two voltage outputs, two communication lines, etc., it should be understood that the circuit may be adapted to any number of power receiver devices. For example, for a single power receiver device, the power source device may include a single buck-boost regulator. Similarly, in an example where one power source device supplies a charge to more than two power receiver devices, the system may be expanded to include additional buck boost regulators, power lines, communication lines, etc.

Figure 4:
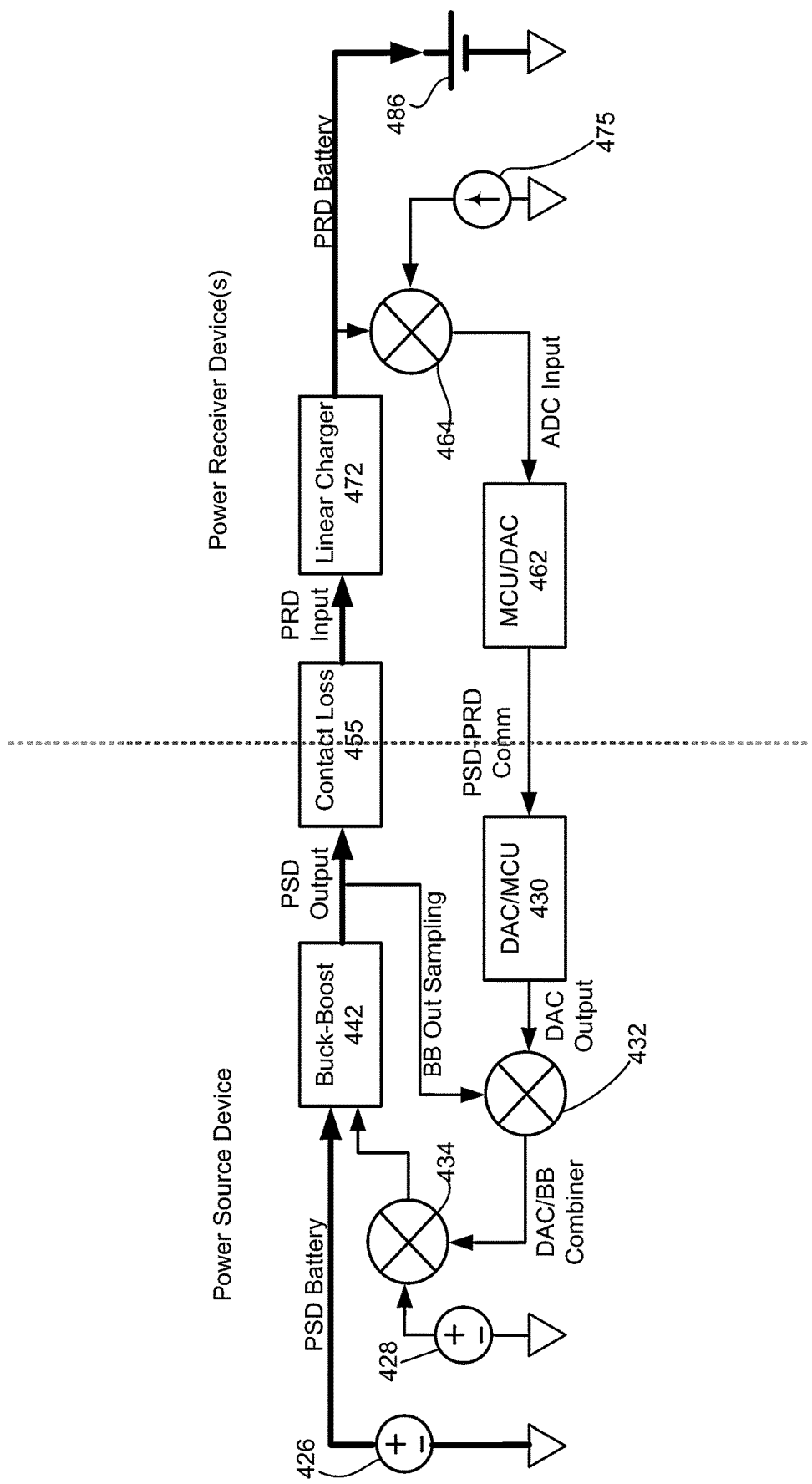
FIG. 4 illustrates an example control flow for a voltage tracking system according to aspects of the disclosure.

FIG. 4 illustrates an example control topology, where the Buck-boost regulator has analog feedback for output regulation, and control is done with a digital-to-analog converter (DAC) from a microcontroller unit (MCU). As shown, PSD battery 426 supplies a charge to linear charger 472 of the PRD through buck-boost regulator 442, suffering some contact loss 455. The linear charger 472 provides the charge to PRD battery 486. A sampling of the output from the linear charger 472 is combined with a reference current 475 at combiner 464, which provides input to a MCU 462. The MCU 462 provides feedback to the MCU 430 of the PSD over a communication line between the two devices. The communication line may be a dedicated line, or in some examples may be integrated with the power line. Combiner 432 combines the output from DAC/MCU 430 with a sampling from the Buck-boost regulator 442, and that is further combined with a reference voltage 428 at combiner 434. The output of the combiner 434 is provided to the buck-boost regulator 442 as feedback.

Figure 5A:
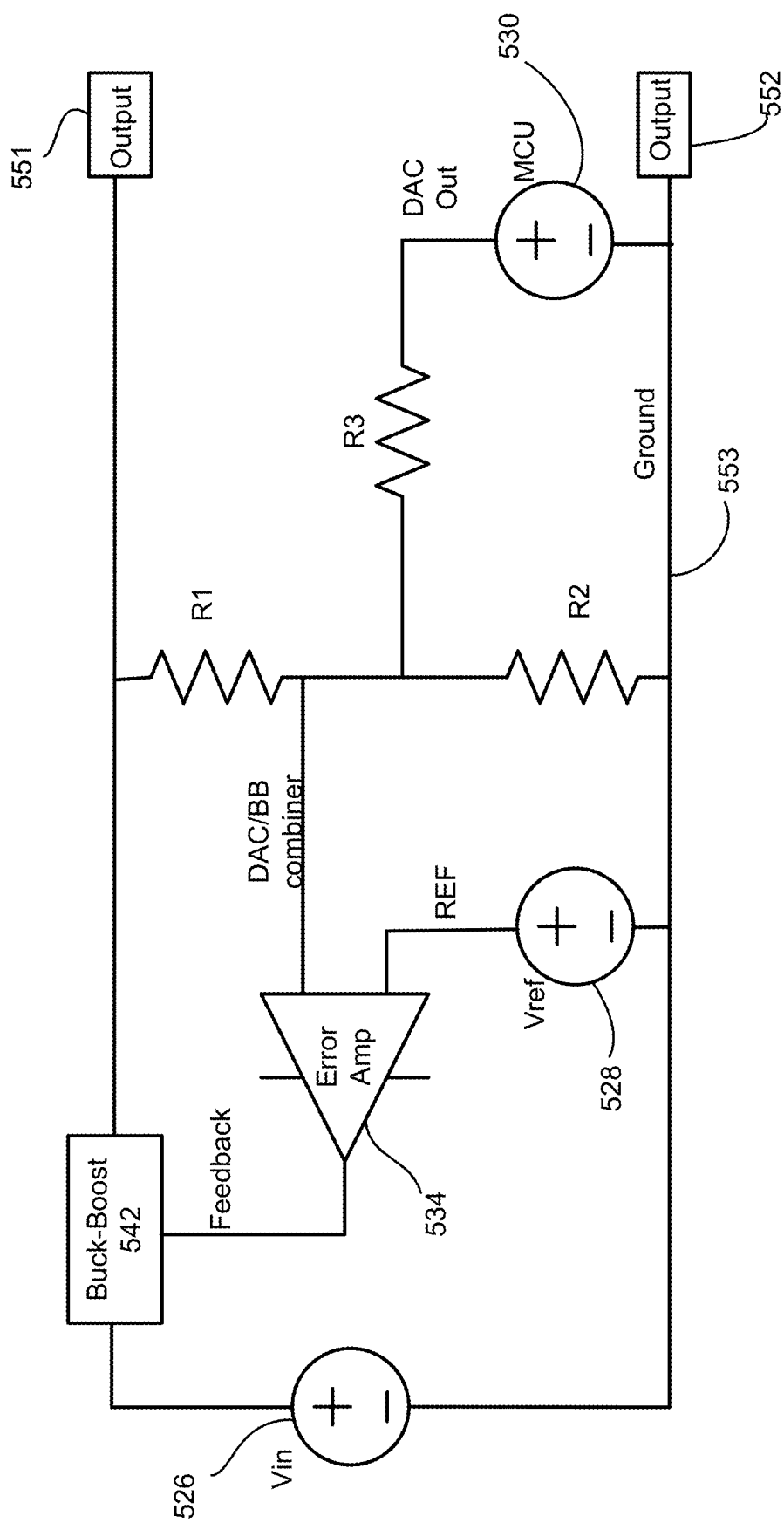
FIG. 5A illustrates an example circuit diagram for a power source device of the voltage tracking system of FIG. 4 according to aspects of the disclosure.

FIG. 5A illustrates example circuitry corresponding to the PSD topology of FIG. 4. Voltage source 526 is input to buck-boost regulator 542, which also receives feedback from error amplifier 534. Error amplifier 534 receives as input a reference voltage 528 as well as combined input from the buck-boost regulator 542 and MCU 530. Though not shown, the MCU 530 receives communication through communication lines, such as CommC1 and CommC2 in previous examples, and executes with DACs. For examples, the DAC is part of a control path from MCU 530, which takes command from CommC1 or CommC2 pins, creates new voltage levels and outputs through the DACs. Regulated voltage is output through a first output line 551. By way of example, in order to get an output range of approximately 3.3V-4.4V, the voltage source MCU 530 outputs 1.8V-0V, respectively. Independent resistors R2 and R3 resolve an equation to achieve linear control for the range. For example, a value for R1 may be chosen by a manufacturer of the Buck-boost. In some example, R1 may be 187K max. R2 and R3 may therefore be calculated as 475K and 309K, respectively. Other voltage source outputs may be used to achieve different output ranges. A ground line 553 may be coupled to a second output 552 for establishing a ground connection with the PRD.

On the PRD side, a battery charger should be capable of handling charging with a wider input range. For example, such input range may be from approximately 3.3V to 4.4V, with <0.2V drop out. Such wider input range allows the PSD buck-boost regulator 542 to operate at a lowest output voltage, tracking the input of PRD and therefore resulting in optimal efficiency. A lower end of the input range may be selected as 3.3V, for example, based on the battery of the PRD. For example, some batteries have low capacity under 3.3V, and therefore will charge up to 3.3V very quickly at 0.1 C rate. In such examples, keeping the lower limit at 3.3V or above can improve control granularity when an overall span from low to high is small.

Figure 5B:
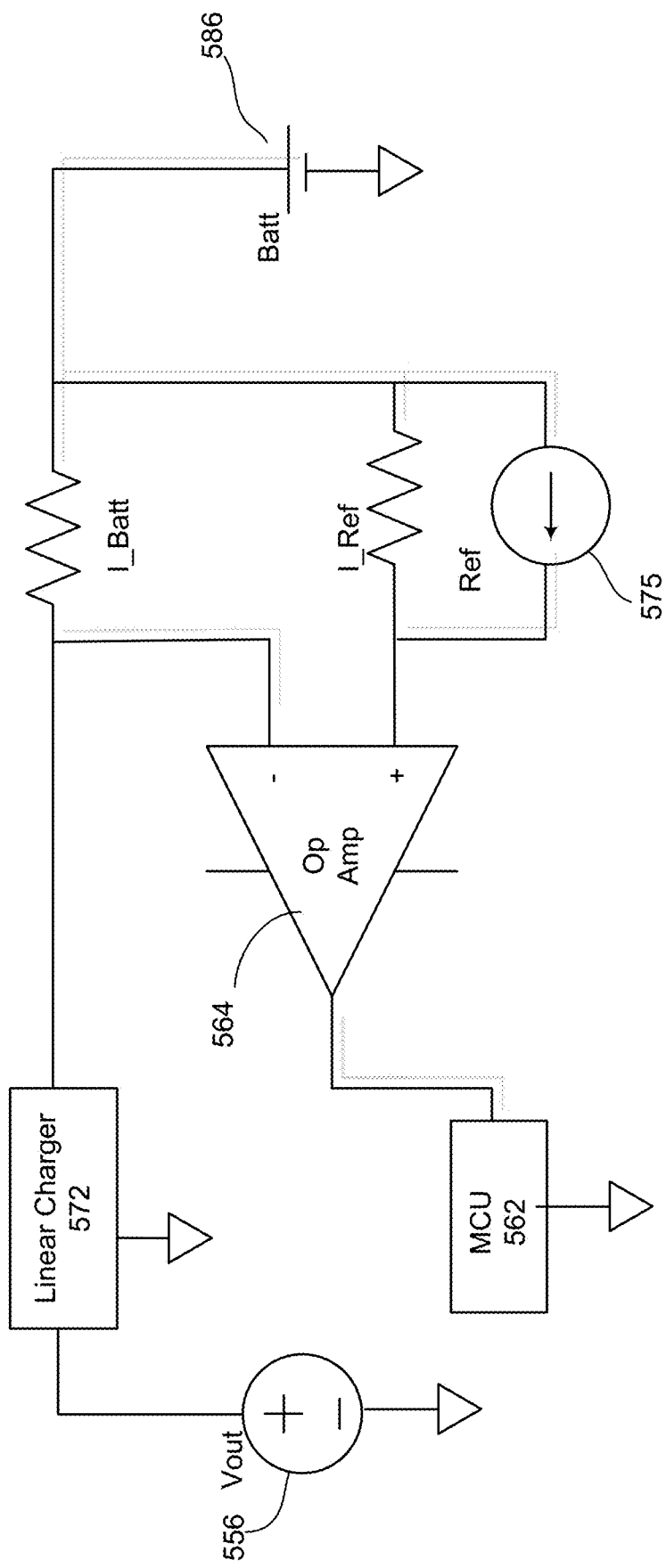
FIG. 5B illustrates an example circuit diagram for a power receiver device of the voltage tracking system of FIG. 4 according to aspects of the disclosure.

FIG. 5B illustrates example circuitry corresponding to the PRD topology of FIG. 4. A low dropout linear charger 572 is connected between Vout 556 from the PSD and battery 586. The battery charging current is sampled with a comparator 564. MCU 562 takes the result, digitizes it, and compares it with an internal threshold. Based on the comparison, the MCU 562 decides whether the PSD output is too low, too high, or within a control range. The output of the MCU 562 is a control sent back to the PSD to request an increase, a decrease, or no change.

It should be understood that various values for elements of FIGS. 4-5 may be used, such as for the voltage sources 426, 526, the reference voltages 428, 528, the MCU 530, the reference current 475, etc. By way of example only, the voltage source 426, 526 may be approximately 3.7V, while the reference voltage 428, 528 may be approximately 0.8V. Keeping with this example, the reference current 475 may be between 3V-4.2V, and the MCU output may be between 0-1.8V. The values for resistors R1-R3 may be relational to the other components. While in the example of FIG. 5 above R1 is set at 187 kΩ, and R2=475 kΩ, and R3=309 kΩ, the values for these resistors and any of the other components may be varied. For example, the values may be varied based on the types of devices used as the PSD and the PRD, other components of the devices such as the buck boost regulators, sizes, capabilities, or other attributes of the devices, or any other design considerations.

In addition to the operations described in connection with the systems above, various operations will now be described in connection with example methods. It should be understood that the following operations do not have to be performed in the precise order described below. Rather, various operations can be handled in a different order or simultaneously, and operations may also be added or omitted.

Figure 6:
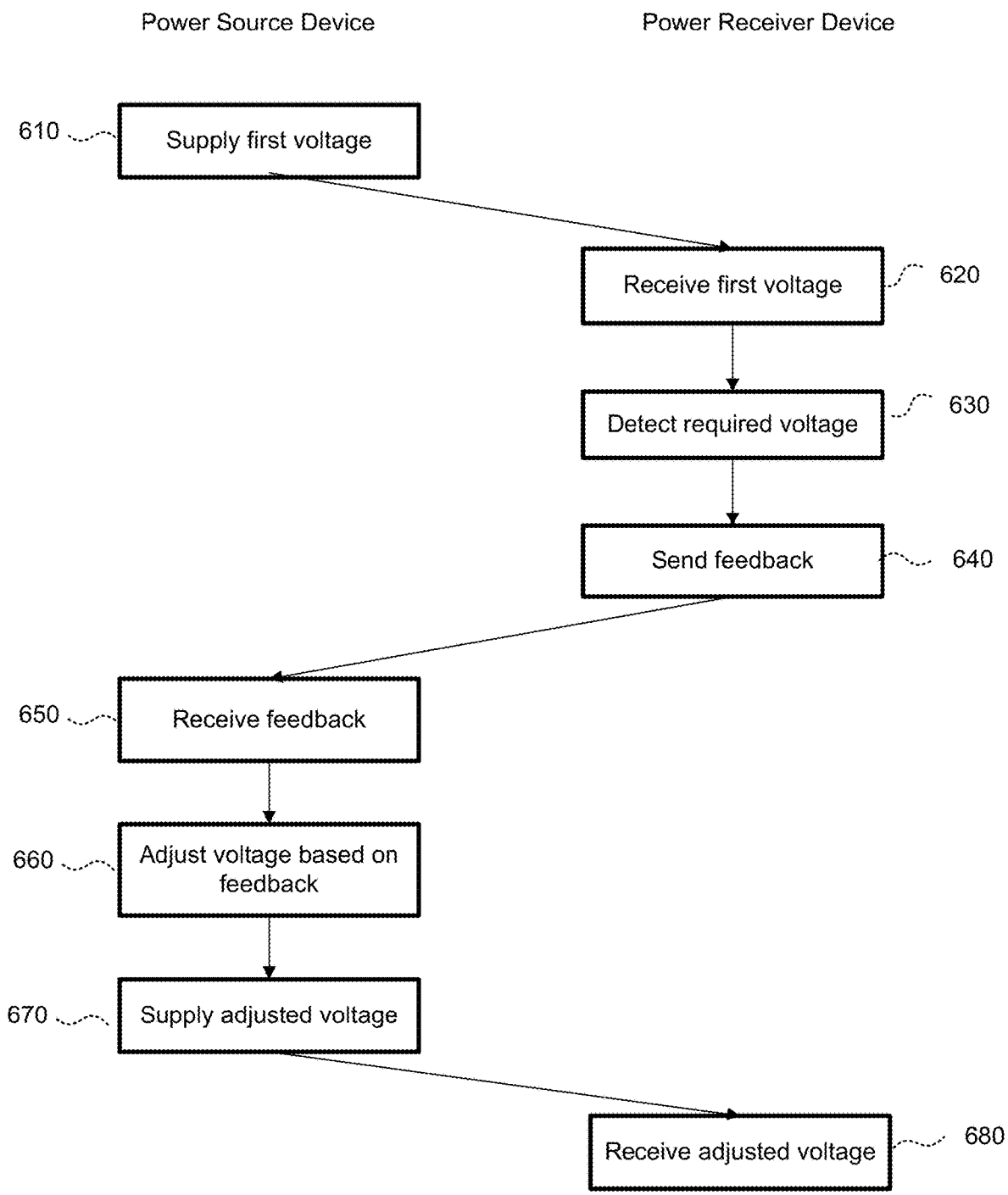
FIGS. 6 is a flow diagram illustrating an example method according to aspects of the disclosure.

FIGS. 6 illustrates an example method of voltage tracking between a power sourced device and a power receiver device. The devices may include any type of electronic devices, such as earbuds, a phone, phone accessories, toys, gaming systems, tablets, etc.

In block 610, the power source device supplies a first voltage, and the power receiver device receives the first voltage in block 620. For example, the power source device may transmit the first voltage over a power line connection established between the power source device and the power receiver device. Such connection may be a wired, or wireless connection established through mating of contacts on each device, induction, etc. The first voltage may be, for example, a default voltage transmitted upon detection of a connection between the power source device and the power receiver device. For example, when an earbud case detects a presence of the earbuds inside the case, the case may transmit the first voltage. In some examples, the first voltage may be a minimum voltage level that the power source device is configured to transmit. In other cases, the first voltage may be based on other conditions, such as a voltage level transmitted at a previous time when the power source device and power receiver device were connected.

In block 630, the power receiver device detects a required voltage. For example, the required voltage may vary based on current battery levels and/or other conditions surrounding the device, such as temperature, etc.

In block 640, the power receiver device provides feedback to the power source device regarding the first voltage. For example, the power receiver device may send an indication of the detected voltage requirements. In another example, the power receiver device may calculate a difference between the first voltage and the required voltage, and send instructions to the power source device for adjusting the transmitted voltage.

In block 650, the power source device receives the feedback from the power receiver device, and in block 660 the power source device adjusts its voltage supplied to the power receiver device. For example, where the feedback includes an indication of the voltage requirements detected by the power receiver device, the power source device may adjust its outputted voltage to meet the requirements. This may include computing a difference between the voltage requirements and the first voltage, and adjusting based on the computed difference. Such adjusting may include increasing voltage output or decreasing voltage output. Adjustment of the voltage output may be performed using, for example, a buck boost regulator as described above.

In block 670, the power source device supplies the adjusted voltage to the power receiver device, which receives the adjusted voltage in block 680. The process of providing feedback and adjusting the output voltage may be repeated continuously or periodically. For example, the power receiver device may provide feedback regarding its voltage requirements every few seconds, every few milliseconds, or at any other interval. As another example, the power receiver device may provide feedback any time is detects a change in its voltage requirements.

The foregoing techniques are beneficial in that they provide for increased efficiency in power transmission from a first device to a second device. Because the first device tracks the voltage requirements of the second device, and dynamically adjusts its output upwards or downwards to match such requirements, it is continually transmitting at an optimal voltage level. As such, a battery life of the first device is extended, and thus usefulness of both the first and second device between charging is extended.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as

The invention claimed is:

1. A method for charging a power receiver device by a power source device comprising:
  supplying a first voltage from the power source device to the power receiver device;
  receiving feedback, at the power source device from the power receiver device, regarding the first voltage, the feedback comprising a required voltage at the power receiver device;
  computing, based on the feedback, a difference between the required voltage and the first voltage; and
  adjusting the first voltage based on the computed difference by adjusting an output voltage of a buck-boost regulator of the power source device.

2. The method of claim 1, wherein supplying the first voltage from the power source device to the power receiver device comprises supplying the first voltage over a wired connection between the power source device and the power receiver device.

3. The method of claim 1, wherein supplying the first voltage from the power source device to the power receiver device comprises supplying the first voltage over a wireless connection between the power source device and the power receiver device.

4. The method of claim 1, wherein the first voltage is a default voltage that is supplied from the power source device to the power receiver device upon detection of a connection between the power source device and the power receiver device.

5. The method of claim 1, wherein the first voltage is a minimum voltage that the power source device is configured to supply.

6. The method of claim 1, wherein the first voltage is based on a previous voltage supplied from the power source device to the power receiver device at a previous time when the power source device and the power receiver device were connected.

7. The method of claim 1, wherein the required voltage is based on at least one of a current battery level or a temperature.

8. The method of claim 1, wherein the step of adjusting the first voltage comprises adjusting the first voltage to meet the required voltage.

9. The method of claim 1, wherein the required voltage is based on at least one of a current battery level or a temperature.

10. The method of claim 1, wherein the steps of supplying, receiving, and adjusting are repeated.

11. The method of claim 10, wherein the steps of supplying, receiving, and adjusting are repeated continuously.

12. The method of claim 10, wherein the steps of supplying, receiving, and adjusting are repeated periodically.

13. The method of claim 1, wherein the steps of receiving and adjusting are performed when there is an indicated change in the required voltage.

14. A method for charging a second device by a first device, comprising:
  receiving an input from a voltage source at a buck-boost regulator of the first device;
  providing a variable voltage output from the buck-boost regulator;
  receiving the variable voltage output from the buck-boost regulator at a linear charger of the second device;
  receiving an output from the linear charger at a battery of the second device;
  providing feedback from the second device to the first device, the feedback comprising a required voltage for the second device; and
  computing, by the first device and based on the feedback, a difference between the variable voltage output and the required voltage, wherein the variable voltage output from the buck-boost regulator is adjusted based on the computed difference from the second device.

15. The method of claim 14, wherein the first device is a case for an electronic accessory and the second device is the electronic accessory.

16. The method of claim 15, wherein the electronic accessory is a pair of earbuds.

17. A method for a power receiver device to receive charge from a power source device comprising:
  receiving at the power receiver device a first voltage from the power source device;
  providing, from the power receiver device to the power source device, feedback regarding the first voltage, the feedback comprising a required voltage at the power receiver device; and
  receiving an adjusted first voltage from the power source device, wherein the adjusted first voltage is generated at the power source device by:
    computing, based on the feedback, a difference between the required voltage and the first voltage; and
    adjusting, according to the computed difference, an output voltage of a buck-boost regulator of the power source device.

18. The method of claim 17, wherein the first voltage is a default voltage that is received by the power receiver device from the power source device upon detection of a connection between the power source device and the power receiver device.

19. The method of claim 17, wherein the first voltage is a minimum voltage that the power receiver device is configured to receive.

20. The method of claim 17, wherein the first voltage is based on a previous voltage received by the power receiver device from the power source device at a previous time when the power source device and the power receiver device were connected.

* * * * *